(12) United States Patent
Rosca

(10) Patent No.: US 8,746,407 B2
(45) Date of Patent: Jun. 10, 2014

(54) CENTRIFUGAL LUBRICATION APPARATUS

(76) Inventor: Andrew Rosca, Stamford, CT (US)

( * ) Notice: Subject to any disclaimer, the term of this patent is extended or adjusted under 35 U.S.C. 154(b) by 151 days.

(21) Appl. No.: 13/101,167

(22) Filed: May 5, 2011

(65) Prior Publication Data

US 2012/0279803 A1 Nov. 8, 2012

(51) Int. Cl.
*F16N 7/36* (2006.01)

(52) U.S. Cl.
USPC ......................................... 184/6.16

(58) Field of Classification Search
CPC .. F04B 39/0253; F04B 39/0246; F16N 7/366; Y10S 417/902
USPC ................................ 184/43, 77, 31, 37, 6.16
See application file for complete search history.

(56) References Cited

U.S. PATENT DOCUMENTS

| | | | |
|---|---|---|---|
| 2,766,929 A * | 10/1956 | Rusch et al. .................. 184/6 |
| 2,797,771 A | 7/1957 | Orr | |
| 3,318,644 A | 5/1967 | Johnson, III | |
| 3,796,283 A | 3/1974 | Raby | |
| 3,858,685 A * | 1/1975 | Bono ........................... 184/6.16 |
| 4,355,963 A * | 10/1982 | Tanaka et al. ................... 418/63 |
| 4,446,933 A | 5/1984 | Bodine | |
| 4,932,500 A | 6/1990 | Smith et al. | |
| 5,088,579 A * | 2/1992 | Kim et al. ..................... 184/6.16 |
| 5,195,481 A | 3/1993 | Oyama et al. | |
| 5,377,781 A * | 1/1995 | Yun ............................... 184/6.23 |
| 5,842,420 A * | 12/1998 | Khoo et al. .................... 184/6.16 |
| 6,161,510 A | 12/2000 | Ishikawa et al. | |
| 6,187,185 B1 * | 2/2001 | Lee ........................... 210/167.02 |
| 6,457,561 B1 * | 10/2002 | Goodnight ................... 184/6.16 |
| 6,484,846 B1 * | 11/2002 | Parker ........................... 184/6.16 |
| 6,527,086 B2 * | 3/2003 | Oh ................................. 184/6.16 |
| 6,702,067 B2 * | 3/2004 | Iversen et al. ............... 184/6.16 |
| 6,796,283 B1 | 9/2004 | Fleury et al. | |
| 6,860,365 B2 * | 3/2005 | Stones ......................... 184/6.16 |
| 7,021,425 B2 * | 4/2006 | Noguchi et al. ............. 184/6.16 |
| 7,441,529 B2 * | 10/2008 | Sotiriades ................. 123/196 W |
| 7,631,729 B2 * | 12/2009 | Tsuchiya et al. ............... 184/6.5 |

* cited by examiner

*Primary Examiner* — William A Rivera
*Assistant Examiner* — Michael Riegelman

(57) ABSTRACT

The "Gheorghe Vasilescu" lubrication apparatus comprises a shaft having a passageway and a sump for storing a lubricant. The sump has a cylindrical form and includes a ring of lugs arranged on an inner surface of the sump. The apparatus further includes a lubricant pickup tube having a first end connected to the passageway and a second end having an intake orifice. The lubricant pickup tube is substantially perpendicular to the shaft axis. The lubricant pickup tube and the shaft are configured to rotate together as one assembly about the shaft axis so that the lubricant pickup tube is capable to pick up the lubricant from sump due to the centrifitgal force arising during such conjoint relative rotation. The passageway is configured to deliver the lubricant from the sump to an outer surface of the shaft.

6 Claims, 6 Drawing Sheets

CENTRIFUGAL LUBRICATION APPARATUS

TECHNICAL FIELD

The present disclosure relates generally to lubrication technique, and more particularly to a lubrication apparatus which utilizes centrifugal forces to provide a lubricating material to the shaft surface.

BACKGROUND

One of the most important conditions defining correct machinery operation is regular bearing lubrication. The insufficient amount of a lubricating material (or a lubricant) or an incorrectly chosen lubricating material inevitably leads to early bearing wear and loss of bearing service life, as well as inefficient operation and unnecessary energy waste.

Lubrication determines bearing longevity on equal terms with a bearing material. The role of lubrication has especially become more essential with the advent of complex friction assemblies, such as vehicle engines, turbines, electrical motors, rotors, machineries, etc., and with the increase of their operation intensity consisting in raising rotary frequencies, loads, and temperature.

The primary function of a lubricant is to reduce friction between two moving solid state surfaces by providing a uniform lubricant layer in the space separating them. Typically, lubricant-to-surface friction is much less than surface-to-surface friction in a system without any lubrication. Thus, the use of the lubricant reduces the overall system friction.

As a result of friction reduction, the lubricant may reduce the amount of wear that occurs during operation, reduce operating temperatures, minimize corrosion of metal surfaces, and may assist in keeping contaminants out of a bearing system, and improves system efficiency. Lubricants have many properties that can be mixed and matched to meet different operating needs. For example, there are different chemicals that can be added to allow a machinery to efficiently run at extreme temperatures. The lubricant can also be made more effective in protecting machinery surfaces under extreme pressures. By looking at the demands of the machinery, one can properly identify the type of lubricant best suited for its proper function.

Traditionally, various techniques can be utilized to perform bearing lubrication using proper lubricants. Conventional devices for providing lubrication include port holes, grease packs, oil slingers, hydraulic pumps, and others. Port holes are generally machined radially through input shafts for ducting oil inwardly to bearings. Grease packs are simply large masses of grease in which pocket bearings are packed during assembly of machineries. Oil slingers and hydraulic pumps involve mechanical pumping actions for providing forced oil flow to bearings.

Port holes are deficient in high speed lubrication of input shafts because oil travels inwardly to bearings only during slow rotation or stoppage of shafts. At high rotation speeds, centrifugal forces throw the oil outwardly rather than inwardly through the port holes, thus starving bearings at high speeds when lubrication becomes more critical.

Grease packs are successful at low speeds and under low loading conditions. However, under increased speed and loading conditions grease packs deteriorate rapidly and are, therefore, unsuitable for long-term bearing lubrication.

Oil slingers and hydraulic pumps are more successful than port holes and grease packs under high speed and load conditions. However, slingers and pumps are generally more expensive, and often work against rather than with centrifugal forces in the movement of lubricant to bearings. In addition they typically require either a separate or derived power source, thus reducing overall system efficiency.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In accordance with one or more embodiments and the corresponding disclosure thereof, various aspects are described herein in connection with the "Gheorghe Vasilescu" centrifugal lubrication technique. By using centrifugal forces, the described apparatuses provide a lubricant to a bearing without having to exploit a pump, thereby decreasing production cost and increasing system efficiency and robustness.

According to one aspect, a lubrication apparatus is provided. The apparatus comprises a shaft having a passageway therein, a sump for storing a lubricant, and a lubricant pickup tube having one end connected to the passageway and another end having an intake orifice. The lubricant pickup tube and the shaft may be configured to rotate together as one assembly about the shaft axis. The lubricant pickup tube may be capable to pick up the lubricant from the sump due to the centrifugal force arising during such conjoint relative rotation. The passageway can be configured to deliver the lubricant from the sump to the outer surface of the shaft.

In one example, the apparatus may further comprise at least one bearing. The shaft may be installed in the bearing. In yet another example, the shaft is fixedly attached to the bearing case. The shaft may be a part of an engine, an electric motor, a turbine, a rotor, a pivot, or alike. In yet another example, the passageway has an S- or L-shaped form. The apparatus may further comprise a lubricant return element for draining back redundant lubricant from the shaft surface to the sump, thereby providing a closed lubrication circuit. The lubricant return element may be a channel between the outer surface of the shaft and the inner surface bearing to be lubricated. The lubricant may be one of mineral oil, synthetic oil, grease, solid lubricant, silicon-based lubricant, or a combination thereof. In yet another example, the sump may further comprise lugs on its inner surface. In yet another example, the tube may comprise a header.

According to another aspect, a lubrication apparatus is provided. The apparatus comprises a shaft having a passageway therein, a sump for storing a lubricant, the sump being configured to rotate about the shaft axis, and a lubricant pickup tube having one end connected to the passageway and the another end having an intake orifice. The lubricant pickup tube may be capable to pickup the lubricant from the sump due to the centrifugal force arising during the rotation of the sump about the shaft. The passageway can be configured to deliver the lubricant from the sump to the outer surface of the shaft.

In one example, the apparatus may further comprise at least one bearing, wherein the shaft is installed in the bearing. The shaft may be fixedly attached to the bearing case. The shaft may be a part of an engine, an electric motor, a turbine, a rotor, a pivot, etc. The passageway has an S- or L-shaped form. The apparatus may further comprise a lubricant return element for draining back redundant lubricant from the shaft surface to the sump, thereby providing a closed lubrication circuit. The lubricant return element may be a channel between the outer surface of the shaft and the inner surface bearing to be lubricated. The lubricant is one of mineral oil, synthetic oil, grease, solid lubricant, silicon-based lubricant, or a combination thereof. In yet another example, the sump may further comprise lugs on its inner surface. In yet another example, the tube may comprise a header.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
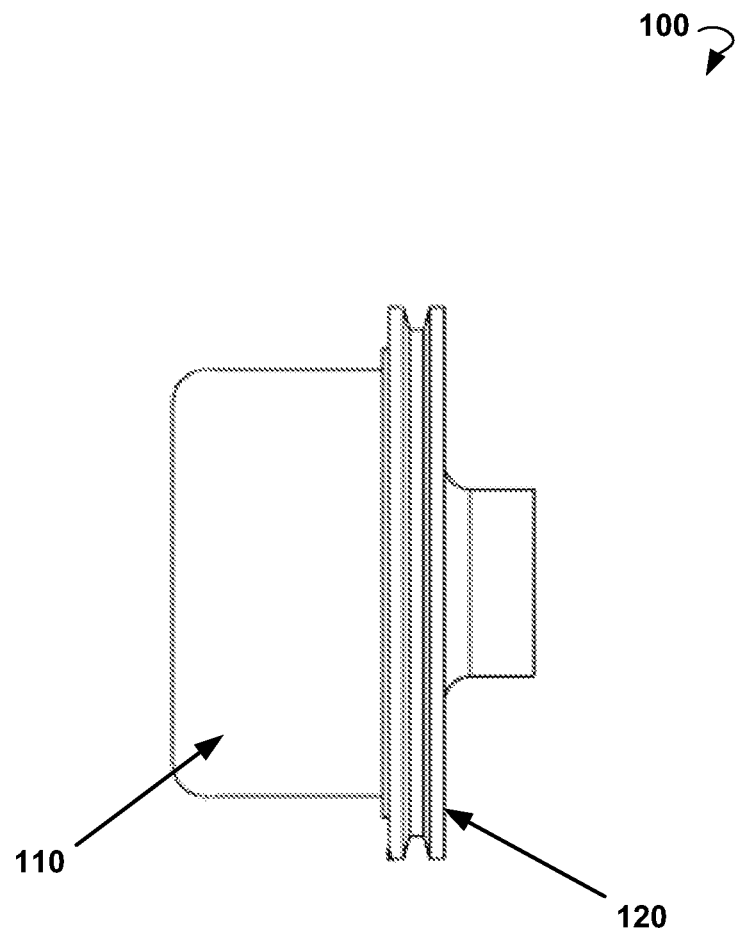
FIG. 1 illustrates a side view of a lubrication apparatus, according to an exemplary embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The word "exemplary" is used herein to mean "serving as an example, instance, or illustration". Any embodiment described herein as "exemplary" is not necessarily to be construed as preferred or advantageous over other embodiments. Likewise, the term "embodiments" does not require that all embodiments include the discussed feature, advantage or mode of operation.

The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

As referred hereinafter, the term "bearing" relates to an article representing a part of a supporting element, which supports a shaft, axis or other engineering design, provides rotation, oscillation or linear movement (for linear bearings) with lower resistance, takes and transmits a load to other parts of a structural system. There are a lot of different types of bearings. As known for those skilled in the art, the main types of bearings used in machinery construction are rotating and gliding bearings.

Still further, as referred hereinafter, the term "lubrication" means the process, or technique employed to reduce wear of one or both surfaces in close proximity, and moving relative to each another, by interposing a substance called a lubricant between the surfaces to carry or to help carry the load (pressure generated) between the opposing surfaces. Adequate lubrication allows smooth continuous operation of equipment, with only mild wear, and without excessive stresses or seizures at bearings. When lubrication breaks down, metal or other components can rub destructively over each other, causing destructive damage, heat, and failure, or otherwise inefficient operation. Lubrication is required for correct operation of mechanical systems such as pistons, pumps, cams, bearings, turbines, cutting tools, etc., where without lubrication the pressure between the surfaces in close proximity would generate enough heat for rapid surface damage which in a coarsened condition may literally weld the surfaces together, causing seizure. Lubricants often also transport heat away from the high friction areas where it is generated, thus increasing system efficiency and lifespan. Typical lubricants include, but are not limited to, mineral oils (e.g. petroleum based products, alkane-based oils, paraffin based oils), synthetic oils, greases (e.g. semisolid lubricants), solid lubricants (e.g. graphite-based, fullerene-based, or molybdenum disulfide ($MoS_2$)-based, tungsten disulfide-based, teflon-based lubricants), silicon-based lubricants, organic lubricants (e.g. vegetable oils, bio oils), lipid-based lubricants, or a combination thereof. Each of these lubricants is suited for particular purposes and conditions, and is also compatible with only certain types of machinery components, demands, and environments. Those skilled in the art should readily understand that any of the above-mentioned types of lubricants can be used in the embodiments disclosed herein.

According to one or more embodiments disclosed herein, the centrifugal lubrication can be applied for rotating and gliding bearings which are peculiar to different products of machine-building industry. Lubrication apparatuses and techniques described herein may be utilized for lubricating rotating elements such as shafts mounted on vehicle engines, electrical motors off all kinds, turbines, fans, rotors, bearings, etc., with a view to increasing power, while reducing fuel/energy consumption.

Figure 2:
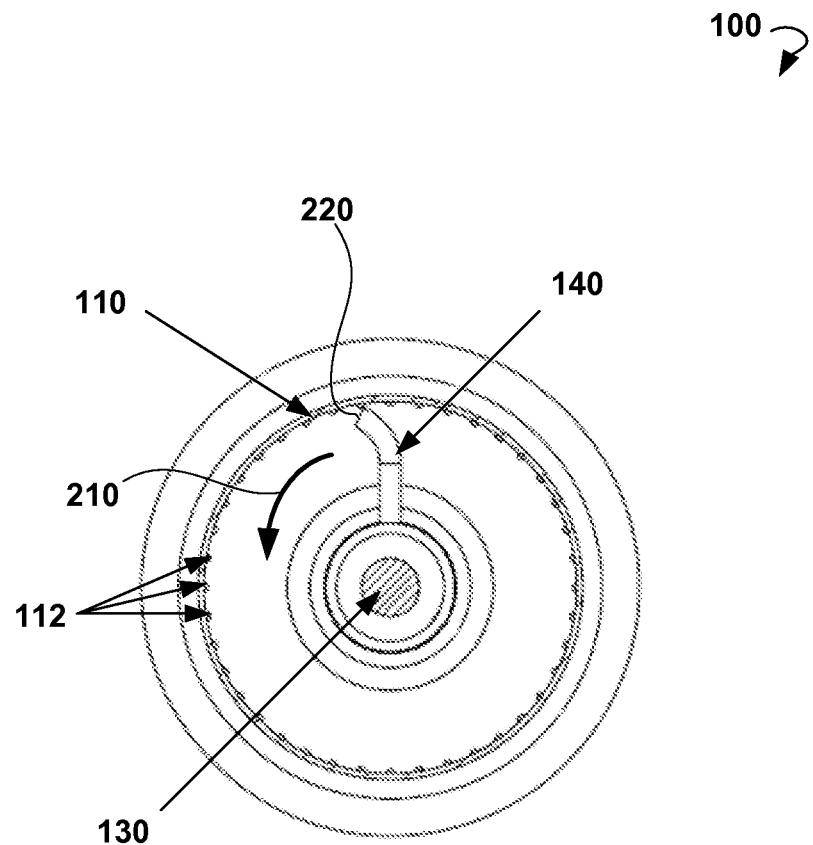
FIG. 2 illustrates a cross section view of the lubrication apparatus of FIG. 1, according to an exemplary embodiment.
Figure 3:
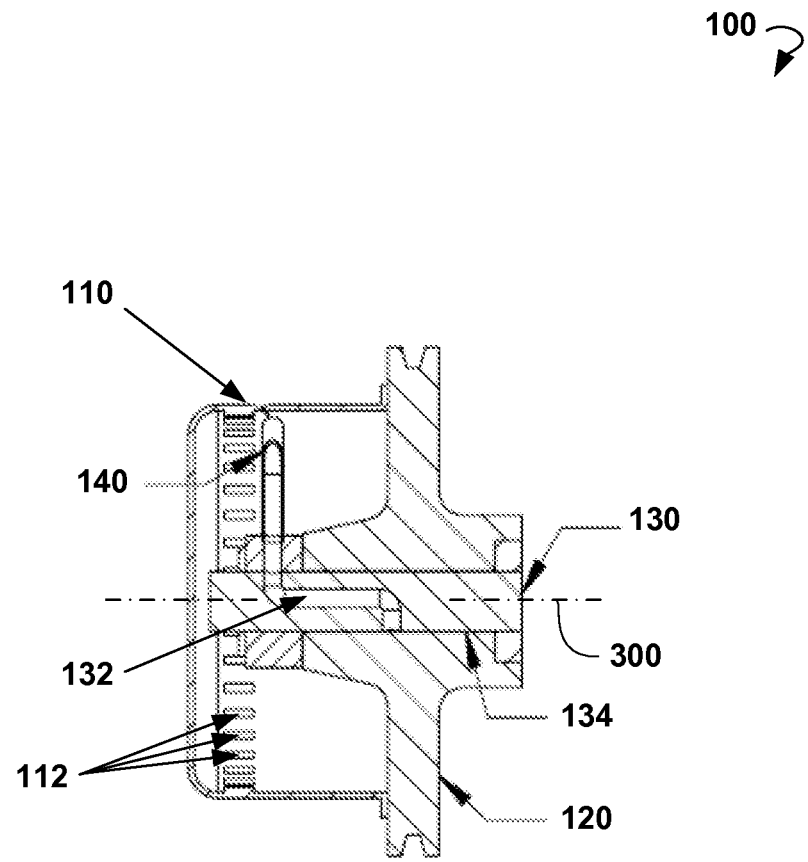
FIG. 3 illustrates a longitudinal section view of the lubrication apparatus of FIG. 1, according to an exemplary embodiment.

Referring now to the drawings, FIGS. 1-3 illustrate different views of a lubrication apparatus 100, according to one exemplary embodiment.

FIG. 1 is a side view of the lubrication apparatus 100. This view shows that the apparatus 100 comprises a sump 110 attached to a bearing housing 120. The bearing housing 120 may be a part of an engine, a motor, a rotor, a turbine, etc. On the other hand, the bearing housing 120 may be a self consistent part of the apparatus 100.

FIG. 2 is a cross section view of the lubrication apparatus 100, according to an example embodiment. This view illustrates the sump 110 and the interior of the apparatus 100 consisting of a shaft 130 and a lubricant pickup tube 140 lightly bending from one side. The shaft 130 is configured to be rotated in a direction 210 about a shaft axis 300 which is further shown in FIG. 3. As also shown, the internal surface of the sump 110 comprises multiple lugs 112. The lugs 112 may prevent sticking between the internal surface of the sump 110 and the lubricant contained in the sump 110 and also assist with accelerating the lubricant via the rotating motion of the sump.

The lubricant pickup tube 140 is attached to the shaft 130 on the one end, while the other end has an intake orifice 220. Alternatively, the tube 140 may have more than one intake orifice. As shown in FIG. 2, the free end of the lubricant pickup tube 140 is lightly bended. However, those skilled in the art may understand that any possible form can be utilized such as linear, L-formed, etc. Furthermore, the tube 140 may optionally comprise a header (not shown) for scooping the lubricant from the sump 110. The header may be of any suitable form, e.g. bowl-shaped, cup-based or alike.

FIG. 3 is a longitudinal section view of the lubrication apparatus 100, according to an exemplary embodiment. This view illustrates the sump 110 attached to the bearing housing 120, the shaft 130 and the tube 140. The shaft 140 has a passageway 132 embedded therein. The passageway 132 has a S-shape form, as shown in FIG. 3, however those skilled in the art would understand that any other form can be utilized, e.g. L-shaped form, T-shaped form, a straight line form, and so forth. According to the shown embodiment, the tube 140 is attached (or embedded) to the shaft 130 such that the passageway 132 and the tube 140 form a single pathway for the lubricant.

The operation principle of the lubrication apparatus 100 is based on the conjoint rotation of the tube 140 and shaft 130 about the shaft axis. If there is no rotation, the lubricant is always resting in the lower part of the sump 110. Once the tube-shaft assembly begins working, i.e. counterclockwise rotating about the shaft axis, the resting lubricant is picked up by the intake orifice of the tube 140. The picked-up lubricant is then forced to flow through the tube 140 and then the passageway 132 in the shaft 140. The lubricant that exits the passageway creates a uniform film along all tangent bearing surfaces 134 providing thereby lubrication of friction surfaces of the shaft 130 and the bearing housing 120. The pressure of the picked-up lubricant can be directly proportional to the revolutions per minute of the tube 140 and shaft 130. The lubricant can be made to exit back into the sump 110 by means of gravity and a sufficient clearance (not shown) between the shaft 130 and housing 120, thereby providing a closed lubrication circuit that has the supplementary benefit of removing excess heat from the bearing. Thus, the apparatus 100 is configured to provide the lubricant continuously to surfaces needing lubrication, such as the surfaces 134, without having to use any pumps or other conveyance methods.

Figure 4:
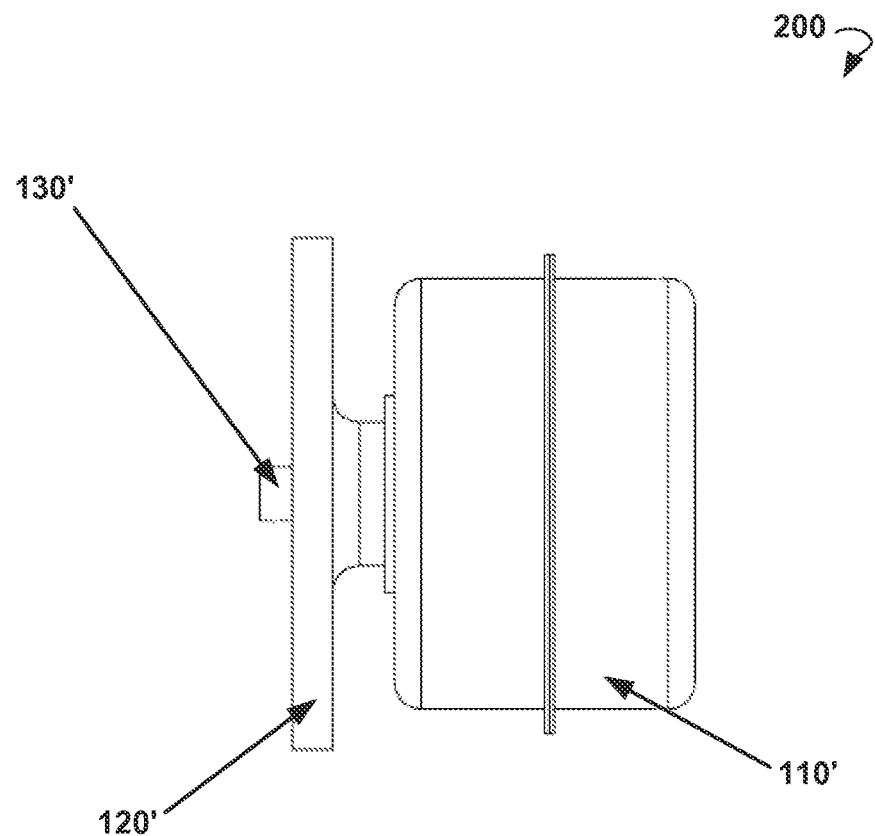
FIG. 4 illustrates a side view of a lubrication apparatus, according to an exemplary embodiment.
Figure 5:
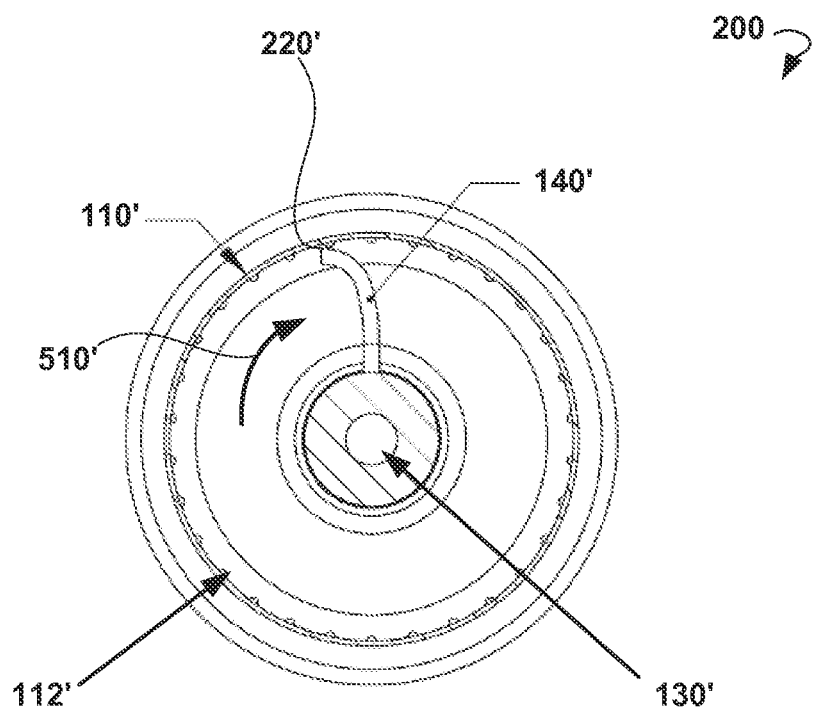
FIG. 5 illustrates a cross section view of the lubrication apparatus of FIG. 4, according to an exemplary embodiment.
Figure 6:
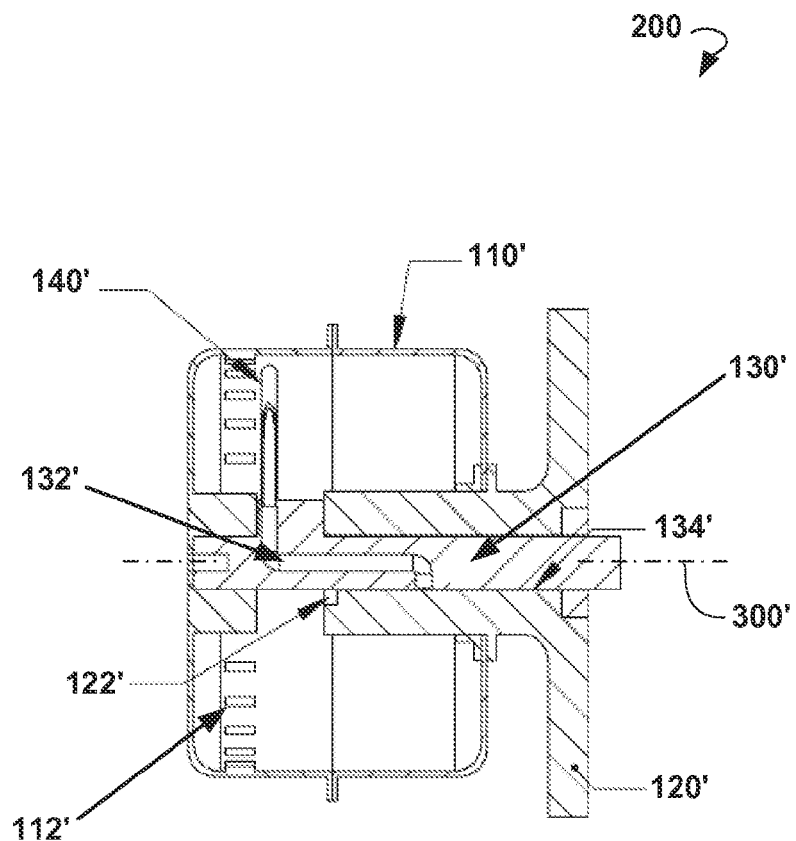
FIG. 6 illustrates a longitudinal section view of the lubrication apparatus, according to an exemplary embodiment.

FIGS. 4-6 illustrate different views of a lubrication apparatus 200, according to yet another exemplary embodiment.

FIG. 4 is a side view of the lubrication apparatus 200. This view shows that the apparatus 200 comprises the sump 110' which is configured separately from the bearing housing 120'. As mentioned above, the bearing housing 120' may be a part of an engine, a motor, a rotor, a turbine, a pivot, etc. The sump 110' may be implemented as a closed cylinder, however any other forms can be applied.

FIG. 5 is a cross section view of the lubrication apparatus 200, according to an example embodiment. This view illustrates the sump 110' and the interior of the apparatus 200 consisting of the shaft 130' and the lubricant pickup tube 140' having an intake orifice 220 on the one end, while the other end is attached (or embedded) to the shaft 130'. In this embodiment, the sump 110' may be configured to be rotated about the shaft 130', and more specifically about the shaft axis 300', in a direction 510'. The tube 140' may be of any suitable shape, e.g. slightly bended at the extended end, a straight line, L-shaped, or alike. For those skilled in the art it can be apparent that more than one tube 140' can be used. Alternatively, the tube may have more than one intake orifice. Furthermore, the tube 140' may optionally comprise a header (not shown) for scooping the lubricant from the sump 110'. The header may be of any suitable form, e.g. bowl-shaped, cup-based or alike.

The internal surface of the sump 110' may optionally comprise multiple lugs 112'. The lugs 112' are configured to prevent sticking between the internal surface of the sump 110' and the lubricant contained in the sump 110' as well as assist with accelerating the lubricant via the rotating motion of the sump.

FIG. 6 is a longitudinal section view of the lubrication apparatus 200, according to an exemplary embodiment. As shown, the shaft 130' has a passageway 132' which is configured such that the tube 140' can be embedded into it or attached to the shaft such that a single path is formed for the lubricant to pass through the tube 140' and the passageway 132'. The passageway 132' may possess any suitable form, e.g. be of S-shaped form, L-shaped form, T-shaped form, a straight line form, etc.

The operation principle of the lubrication apparatus 200 is based on the rotation of the sump 110' about the shaft 130' which remains constantly still. It should be apparent that, while there is no rotation, the lubricant leeks in the lower part of the sump 110' under the action of the gravitational force. Once the sump 110' begins working, i.e. counterclockwise rotating about the fixed shaft 130', the lubricant takes the shape of a ring which rotates together with the sump due to the centrifugal force. During such rotation, the lubricant is picked up by the intake orifice of the tube 140'. The picked-up lubricant then flows through the tube 140' and then through the passageway 132' to the tangent surfaces 134' needing lubrication and creates a uniform film between them. The centrifugal force exerted upon the lubricant by the rotary motion shall be sufficient to generate significant pressure inside tube 140' and all subsequent lubrication paths. The pressure of the picked-up lubricant can be directly proportional to the revolutions per minute of the sump. The redundant amount of the lubricant can be also drained back to the sump 110' by means of a light relief (or channel) in the housing 120' with an ample clearance 122' for the lubricant to pass, thereby providing a closed lubrication circuit that has the supplementary benefit of removing excess heat from the bearing. Thus, the lubrication apparatus 200 is capable of providing the lubricant continuously to the tangent surfaces 134' needing lubrication without having to use any pumps or other conveyance methods.

Although the above-described two different lubrication apparatuses 100 and 200 comprise the tube 140, 140' which may be counterclockwise bended from one side, those skilled in the art should understand that the tube 140, 140' can be made in any other form which will be more suitable for a given bearing design. It should be also apparent for those skilled in the art that the passageway 132, 132' holing through the shaft 130 can have various forms, depending on a particular bearing design.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What I claim is:

1. A lubrication apparatus comprising:
    a shaft having a passageway therein, the shaft being configured to rotate around a shaft axis;
    a sump for storing a lubricant, the sump has a cylindrical form and includes a bottom and side walls, wherein the sump further includes a ring of multiple parallel lugs arranged on an inner surface of the side walls; and
    a lubricant pickup tube having a first end connected to the passageway and a second end having an intake orifice, the lubricant pickup tube being substantially perpendicular to the shaft axis, and wherein the intake orifice being substantially tangential to the shaft axis;
    wherein the lubricant pickup tube and the shaft being configured to rotate together as one assembly about the shaft axis, the lubricant pickup tube being capable to pick up the lubricant from the sump due to the centrifugal force arising during such conjoint relative rotation;
    wherein the lugs being arranged so as to face the second end of the lubricant pickup tube; and
    wherein the passageway being configured to deliver the lubricant from the sump to an outer surface of the shaft.

2. The apparatus of claim 1, further comprising at least one bearing, wherein the shaft is installed in the at least one bearing.

3. The apparatus of claim 1, wherein the passageway has an S-shaped form.

4. The apparatus of claim 1, further comprising a lubricant return channel for draining back redundant lubricant from the shaft surface to the sump, thereby providing a closed lubrication circuit.

5. The apparatus of claim 1, wherein the lubricant comprises mineral oil, synthetic oil, grease, solid lubricant, silicon-based lubricant, or a combination thereof.

6. The apparatus of claim 1, wherein the lubricant pickup tube is bended and has a L-shape.

* * * * *